3,058,813
APPARATUS FOR OXIDATION OF ORGANIC LIQUIDS
James E. Barney II, Gary, and William G. Tuskan, Hammond, Ind., and Albert L. Hensley, Jr., Lansing, Ill., assignors to Standard Oil Company, Chicago, Ill., a corporation of Indiana
Filed July 31, 1959, Ser. No. 830,880
1 Claim. (Cl. 23—253)

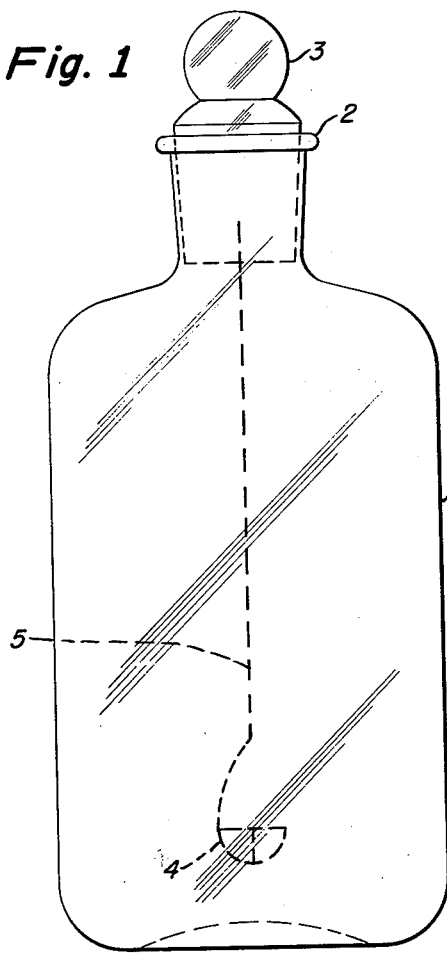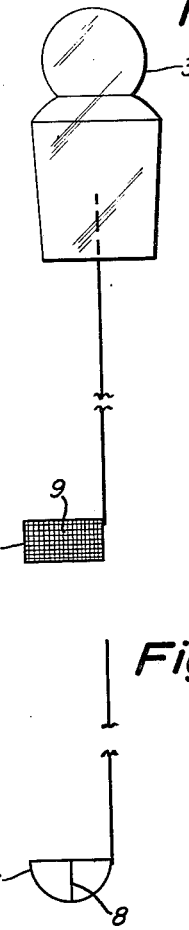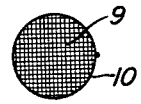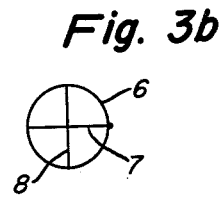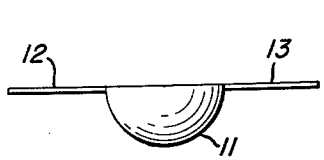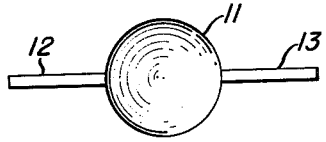
INVENTORS:
James E. Barney, II
William G. Tuskan
Albert L. Hensley, Jr.

This invention relates to an improved apparatus useful for the analysis of organic liquids and solids. More particularly, the invention provides an improved oxidation apparatus for combustion of organic compounds preparatory to a detailed analysis of their components.

A novel method has recently been devised for analyzing organic liquids and solids for components thereof. This method, referred as the "Schöniger technique" (Mikrochim. Acta, 1955, 123; Mikrochim. Acta 1956, p. 869), involves the combustion of a known amount of sample in an oxygen-enriched atmosphere, followed by absorption of the combustion products in a suitable liquid medium and conventional analysis of the resultant liquid for the desired component. This technique has been employed for the determination of phosphorus, halogens, sulfur, and many other elements.

While the Schöniger techniquer is rapid and accurate, it nevertheless suffers several disadvantages. Primarily, the rudimentary equipment devised by Schöniger and subsequent workers involved combustion in folded filter paper or in a broken capillary tube held in a simple platinum wire harness. This equipment makes weighing of small samples exceedingly difficult. Also, the disclosed technique requires inversion of the oxidation bottle after combustion, which, with absorbents such as nitric acid, presents safety hazards to operating personnel.

A primary object of the present invention is to provide an improved apparatus for conducting laboratory analysis according to the Schöniger technique wherein precision of weighing small samples is materially increased. A further object is to provide such apparatus which does not require inversion of the oxidation bottle. Yet another object is to improve the facility with which solid or liquid samples can be burned. Other and more particular objects will become more apparent as the description of the invention proceeds.

Briefly, in accordance with the invention, there is provided an improved Schöniger oxidation apparatus comprising a bottle for confining the oxidizing atmosphere, a stopper to close the bottle, and a platinum wire basket carried by the stopper and which receives a cellulose cup which contains the actual sample. This cellulose cup is made of an ash-free paper such as filter paper or may be a conventional laboratory extraction thimble, and may be provided with a pair of "ears" or extensions to facilitate handling and to act as a fuse. By means of such fuse, the cellulose cup can be ignited outside of the bottle and then inserted therein prior to oxidation without any possibility of escape of the sample before analysis.

The invention will be described in detail in the ensuing specification when read in conjunction with the attached drawings wherein:

FIGURE 1 is a preferred embodiment of the invention showing oxidation bottle, platinum wire basket, and cellulose cup which contains the sample;

FIGURE 2a is an enlarged side view of the sample-containing cellulose cup;

FIGURE 2b is a top view of the cup shown in FIGURE 2a;

FIGURE 3a is a side view detailing a platinum wire basket of a type found most suitable for combustion of liquid samples;

FIGURE 3b is a top view looking immediately down on to the platinum wire basket of FIGURE 3a;

FIGURE 4a depicts a side view of the stopper and a wire basket which is especially useful in the combustion of solid compounds; and FIGURE 4b is a top view of the platinum wire basket detailed in FIGURE 4a.

Turning first to FIGURE 1 showing an overall view of the improved apparatus, the equipment essentially comprises a large oxidation bottle 1 which is provided with a nozzle 2 into which is inserted a stopper 3. Depending from stopper 3 and extending into bottle 1 is a platinum wire basket 4 which is carried by wire or rod 5.

Oxidation bottle 1 may be a conventional glass or corrosion resistant plastic flask having a volume suitably of the order of one liter; conventional reagent bottle or Erlenmeyer flasks are suitable for this purpose. In use, the bottle is filled with an enriched oxygen atmosphere conveniently by inserting a tube into the bottle and displacing the air with oxygen gas.

Stopper 3 is adapted to tightly fit nozzle 2 and conveniently has a standard taper on the body thereof to meet with a similar taper on nozzle 2.

A wire 5 of platinum or other corrosion resistant metal is carried by stopper 3. Wire 5 is conveniently imbedded into the glass of stopper 3 by fusion or the like so as to afford a permanent structure. At the lower end of wire 5 is a platinum wire basket 4. Platinum wire is employed since its catalytic action facilitates oxidation of the sample.

The side view of FIGURE 3a and the top view of FIGURE 3b detail a simple embodiment of a platinum wire basket of the type which may be attached to wire 5 of FIGURE 1. This basket has a peripheral ring 6 and a pair of cross wires 7 and 8 which form the bottom-supporting structure. The intersections of wires 7 and 8 with peripheral ring 6 may be secured by welding or by bending the end of wires 7 and 8 of the ring 6.

In the side view of FIGURE 4a and the top view of FIGURE 4b, a platinum wire basket is shown which is especially suitable for combustion of solid samples. Unless finely divided, solids may burn at an exceedingly slow rate and may survive the combustion of the cellulose sample cup. Accordingly, the basket shown in FIGURES 4a and 4b is made entirely of platinum wire screening on both the side portion 9 and the bottom portion 10 to contain the solid sample even after the paper cup has burned away. 45 mesh screening is suitable. The basket is typically about ½" in diameter and about ¼" high, dimensions which are also suitable for the basket of FIGURES 3a and 3b.

The sample for combustion, whether liquid or solid, is placed in a cellulose cup 11 shown in FIGURES 2a and 2b. This cup is made of substantially pure cellulose fibers so that upon combustion it leaves essentially no ash to interfere with subsequent analysis of a sample undergoing test. Cup 11 may be formed from a 10 x 50 millimeter chemical extraction thimble, or may be fabricated from filter paper pulp. As shown in FIGURES 2a and 2b, cup 11 has a hemispherical portion which contains the sample and is provided with a pair of ears or flaps 12 and 13 which are extentions of body cup 11. These flaps or ears render the cup easy to handle with tweezers or the like and permit the cup 11 to be placed in a microbeaker for weighing before and after the introduction of the sample into the cup.

In addition, either of these flaps or ears constitutes a wick portion for delaying ignition of the sample; the wick may be lit before the stopper with its contained sample is placed in position within oxidation bottle 1. The dimensions of cup 11 are not critical, provided only that it be of a suitable size to contain the sample undergoing combustion and to fit into the platinum wire basket.

Thus, cups of from ¼" to 1" in diameter, and from ¼" to 1" high of any suitable shape may be employed.

To illustrate the employment of the instant invention in conducting an analysis for phosphorus content, a lubricating oil containing metal salts of an organo-phosphorus compound as a detergent is burned in the inventive equipment and the oxidation products are colorimetrically analyzed for phosphorus according to the procedure described in "American Society Test Materials Designation D1091–58T, Phosphorus Lubricant Oils, Lubricant Oil Additives and Their Concentrates." The colorimetric procedure may be found in ASTM Standards for 1958, Part 7, pp. 562–571.

The apparatus consists of a one-liter combustion bottle 1, together with a platinum wire basket constructed according to FIGURE 3 and utilizing a 10 x 50 mm. Whatman extraction thimble made according to FIGURE 2. The colorimetric analysis is performed with a Beckman Model DU spectrophotometer or a Model B colorimeter. The reagents necessary for colorimetric analysis are an ammonium vanadate solution, prepared by dissolving 2.5 grams of ammonium vanadate in 500 ml. of hot water, then adding 20 ml. concentrated nitric acid and diluting to one liter; and an ammonium molybdate solution prepared by dissolving 50 grams of $$(NH_4)_6Mo_7O_{24} \cdot 4H_2O$$

in warm water, diluting to one liter, and filtering before using.

PROCEDURE

The procedure consists of two parts: combustion of the sample, and colorimetric determination of phosphorus. Two alternative schemes for determining phosphorus are presented. The first, to be used where time is important, is an ordinary colorimetric procedure that can be carried out on nearly any colorimeter or spectrophotomer, and is similar to the scheme in ASTM D1091–54T; the second, designed to give the greatest accuracy with only a slight sacrifice in speed, is a differential procedure that requires a Beckman DU spectrophotometer or equivalent.

Combustion

To a 1-liter bottle 1, 20 ml. of a solution of 1:5 nitric acid: water is placed. 100 mg. or less (±0.1 mg.) of oil or additive is weighed into sample container 11; to prevent mechanical loss of sample the container is suspended in a 10-ml. microbeaker using the paper strips or flaps as supports. The container is handled only with forceps. Bottle 1 is filled with oxygen, the standard taper joint moistened, and the bottle stopped with a cork or rubber plug. The container 11 is transferred to the wire basket 4 and the paper strips 12 and 13 are bent to a vertical position. Both paper strips are ignited, the stopper is removed from the bottle 1, and the sample holder is quickly inserted. The stopper 3 is held firmly in place manually during combustion. After combustion is complete the stopper need not be held in place. The combustion should produce only traces of soot.

The bottle 1 is shaken intermittently for ten minutes, or until all the vapors have condensed and the air above the liquid is clear. Bottle 1 is tilted and the sample support lowered into the dilute nitric acid solution. The solution is boiled for two minutes, transferred quantitatively to a 100-ml. volumetric flask by filtering through washed Whatman No. 50 or 52 filter paper, diluted to the mark, and mixed.

Colorimetry

To determine phosphorus colorimetrically, transfer a suitable aliquot to a 100-ml. volumetric flask and add sufficient 1:2 nitric acid:water to make the final solution 0.5 normal in nitric acid. Dilute to about 50 ml., and add 10 ml. each of the ammonium vanadate solution and the ammonium molybdate solution in the order named and with adequate mixing between additions. Dilute to 100 ml. and mix thoroughly. After 30 minutes read absorbance at 465 mμ in a suitable spectrophotometer or colorimeter in 1-cm. or 5-cm. cells against a reagent blank. Convert absorbance to percent phosphorus with the aid of either of suitable calibration curves prepared with a standard solution of potassium dihydrogen phosphate.

Differential Spectrophotometry

To determine phosphorus in additives containing more than 2% phosphorus by differential spectrophotometry, burn a quantity of additive containing 2.0 to 2.6 mg. phosphorus. Transfer a 50-ml. aliquot to a 100-ml. volumetric flask and add sufficient 1:2 nitric acid:water to make the final solution 0.5 normal in nitric acid. Dilute to about 50 ml., and add 10 ml. each of the ammonium vanadate solution and the ammonium molybdate solution in the order named and with adequate mixing between additions. Dilute to 100 ml. and mix thoroughly. At the same time, treat two reference standards containing 1.000 and 1.300 mg. phosphorus as potassium dihydrogen phosphate in the same manner. After 30 minutes, adjust the sensitivity control of a Beckman DU spectrophotometer with the low standard in the light beam instead of a blank, and read the absorbance of the sample and the high standard. Calculate percent phosphorus $$\text{Percent } P = \left(1 - 0.3\frac{A_u}{A_s}\right)\frac{2}{10w}$$

where $A_u$=absorbance of unknown
$A_s$=absorbance of high standard
$w$=weight of sample, in g.
2=aliquot factor

RESULTS

To test the colorimetric method, duplicate analyses were performed on oils and additives representing a variety of commercial and experimental products. To test the differential spectrophotometric method, some of the same additives were analyzed by that procedure. These oils and additives contained barium, calcium, and zinc salts of sulfonates and organo-phosphorus compounds, plus viscosity index improvers.

Results obtained on the oils and additives are shown in Table I. As expected precision of the differential spectrophotometric method is better than the precision of the colorimetric method, and precision of the colorimetric method is comparable to that of ASTM D1091–54T. Agreement between the two methods and ASTM D1091–54T is within the stated repeatability of the latter.

TABLE I.—ANALYSIS OF OILS AND ADDITIVES
[Phosphorus, percent]

OILS

| Metals Present | Colorimetric | Differential Colorimetric | ASTM D1091–54T |
|---|---|---|---|
| Barium, Zinc | 0.103, 0.109 | | 0.119, 0.115 |
| Barium, Calcium, Zinc | 0.288, 0.291 | | 0.307, 0.292 |

ADDITIVES

| | | | |
|---|---|---|---|
| Barium | 1.09, 1.21 | | 1.15, 1.10 |
| Barium, Zinc | 1.37, 1.33 | | 1.30, 1.33 |
| Zinc | 5.90, 5.91 | 5.86, 5.91 | 5.99, 6.00 |

Certain simple precautions are necessary to ensure safe operations. At least 7 lbs. sq. in. pressure is produced during the few seconds of combustion of 100 mg. of oil, so the stopper must be held in place during this interval. After combustion, the contents of the flask are below atmospheric pressure. Although several thousand samples have been burned without any glass breakage, combustion should be carried out inside a Desiguard type desiccator shield as a safety precaution.

ADDITIONAL EXAMPLE I

As a further illustration of the invention, lubricant oils containing zinc were analyzed by oxiding them in the improved Schöniger apparatus and determining zinc by the zincon colorimetric method (Rush and Yoe, Anal. Chem. 26, 1345, 1954). For a referee method, the extraction-complexometric method of Bertolacini (Petroleum Refiner 37, 147, 1958), was used. Results were:

| Sample | Percent Zinc | |
|---|---|---|
| | Schöniger-Colorimetry | Extraction-Complexometry |
| 1 | 11.54 | 11.54 |
| 2 | 11.94 | 11.77 |
| 3 | 12.53 | 12.46 |
| 4 | 8.69 | 8.70 |

The Schöniger technique is thus considerably faster than the extraction technique, yet gives equally accurate results.

ADDITIONAL EXAMPLE II

Another illustration of the usefulness of the invention: a lubricant oil containing boron was analyzed by oxidizing it in the Schöniger apparatus, containing 1:10 HCl:$H_2O$ as absorbent, and boron was determined colorimetrically (Anal. Chem. 32, 295, 1955). Results were:

Boron, Percent
0.644
0.657
0.656

No satisfactory referee method for boron is available; however, this oil was estimated to contain 0.7% boron.

From the foregoing description, it is apparent that there has been provided an improved oxidation technique which offers numerous advantages over hereto available systems. The inventive method is both faster and safer than chemical oxidation, and is more reliable than dry ashing even with zinc oxide, as the combustion takes place in a closed system. The entire period of analysis is only about one hour. Furthermore, the new sample container is more satisfactory than capillary tubes or gelatin capsules for non-volatile liquid samples and is easier to use than folded filter paper for solid samples.

While the invention has been described with reference to particular embodiments thereof, these are by way of illustration only. Modifications and variations will accordingly be apparent to those skilled in the art and it is thus intended to embrace all such modifications and variations as fall within the spirit and broad scope of the invention.

We claim:

An improved apparatus for conducting the Schöniger oxidation technique which comprises: an oxidation bottle adapted to confine an atmosphere enriched in oxygen gas, said bottle having a tapered stopper-receiving port therein; a tapered stopper receivable in said port in gas-tight relationship; a rod depending from said tapered stopper; a platinum wire basket carried by said rod and insertable into said oxidation bottle, said basket having both side and bottom support wires of platinum; and an ash-free cellulosic cup receivable in said platinum wire basket and adapted to carry a relatively large size combustible sample, said cellulosic cup having a wick portion of cellulosic material for ease in handling and weighing said sample and to provide a means for delaying ignition of said sample.

References Cited in the file of this patent

Evans: Anal. Chem., November 1934, pages 409 and 410.

Schöniger: Microchim, Acta, 1955, pages 123–129.